US011632263B2

(12) United States Patent
Bivans

(10) Patent No.: US 11,632,263 B2
(45) Date of Patent: Apr. 18, 2023

(54) SYSTEM AND METHOD FOR SAFETY MESSAGE LATENCY CHARACTERIZATION

(71) Applicant: Fort Robotics, Inc., Philadelphia, PA (US)

(72) Inventor: Nathan Bivans, Philadelphia, PA (US)

(73) Assignee: Fort Robotics, Inc., Philadelphia, PA (US)

(*) Notice: Subject to any disclaimer, the term of this patent is extended or adjusted under 35 U.S.C. 154(b) by 0 days.

(21) Appl. No.: 17/538,948

(22) Filed: Nov. 30, 2021

(65) Prior Publication Data

US 2022/0200818 A1      Jun. 23, 2022

Related U.S. Application Data

(60) Provisional application No. 63/119,368, filed on Nov. 30, 2020.

(51) Int. Cl.
*H04L 7/00*  (2006.01)
*H04L 12/40* (2006.01)
*H04L 1/00*  (2006.01)

(52) U.S. Cl.
CPC ...... *H04L 12/40071* (2013.01); *H04L 1/0018* (2013.01); *H04L 1/0036* (2013.01); *H04L 7/0016* (2013.01); *H04L 12/4013* (2013.01)

(58) Field of Classification Search
CPC ............. H04L 12/40071; H04L 1/0018; H04L 1/0036; H04L 7/0016; H04L 12/4013; H04W 24/08; H04W 56/009; H04W 48/02
See application file for complete search history.

(56) References Cited

U.S. PATENT DOCUMENTS 11,127,295 B2 *  9/2021  Radha ................... G06V 10/82
2013/0094509 A1   4/2013  Chen et al.
(Continued)

FOREIGN PATENT DOCUMENTS

WO    WO-2020132258 A1 *  6/2020  ........... G05D 1/0022

OTHER PUBLICATIONS

Baee et al., "Broadcast Authentication in Latency-Critical Applications: On the Efficiency of IEEE 1609.2", IEEE, Dec. 2019, retrieved on [Jul. 3, 2022], Retrieved from the internet entire document.
(Continued)

*Primary Examiner* — Jay P Patel
(74) *Attorney, Agent, or Firm* — Run8 Patent Group, LLC; Peter Miller

(57) ABSTRACT

A method comprising: accessing a response mapping defining a set of safety-critical functions associated with a safety-critical latency threshold and a set of safety responses, each safety response corresponding to a safety-critical function; executing a time-synchronization protocol with a transmitting system to calculate a clock reference; accessing a safety message schedule indicating an expected arrival time for each safety message in a series of safety messages based on the clock reference; for each safety message in the series of safety messages, calculating a latency of the safety message based on an arrival time of the safety message and the expected arrival time; and in response to a latency of a current safety message in the series of safety messages exceeding the safety-critical latency threshold, initiating the safety response corresponding to the safety-critical function for each safety-critical function in the set of safety-critical functions.

20 Claims, 8 Drawing Sheets

(56) References Cited

U.S. PATENT DOCUMENTS

| | | |
|---|---|---|
| 2014/0223057 A1 | 8/2014 | Fredriksson |
| 2017/0024500 A1 | 1/2017 | Sebastian et al. |
| 2019/0159237 A1 | 5/2019 | Wei et al. |
| 2019/0201136 A1* | 7/2019 | Shelton, IV .............. A61M 1/79 |
| 2020/0029343 A1 | 1/2020 | Wang et al. |
| 2020/0201336 A1* | 6/2020 | Myers .................. G05D 1/0276 |
| 2020/0312155 A1* | 10/2020 | Kelkar ................ B60W 60/005 |
| 2021/0291835 A1* | 9/2021 | Jalali .................... B60W 40/04 |
| 2021/0295703 A1* | 9/2021 | Jalali ................ G08G 1/096741 |

OTHER PUBLICATIONS

International Search Report received in PCT/US2021/061275 dated Mar. 30, 2022.

* cited by examiner

SYSTEM AND METHOD FOR SAFETY MESSAGE LATENCY CHARACTERIZATION

CROSS-REFERENCE TO RELATED APPLICATIONS

This Application claims the benefit of U.S. Provisional Application No. 63/119,368, filed on 30 Nov. 2021, which is incorporated in its entirety by this reference.

TECHNICAL FIELD

This invention relates generally to the data communication field, and more specifically to a new and useful system and method in the data communication field.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 6:
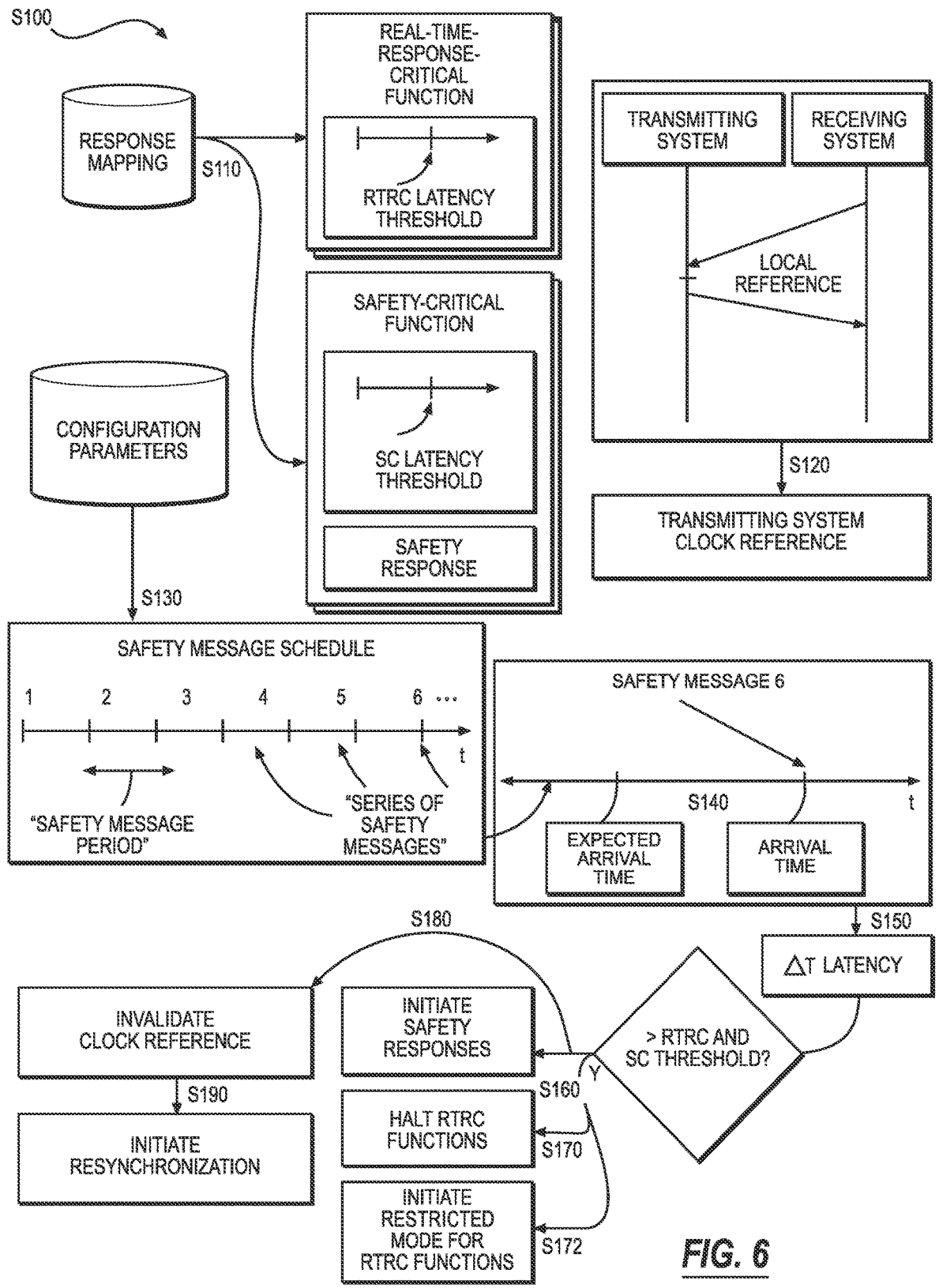
FIG. 6 is a flowchart representation of a method.

As shown in FIG. 6, a method S100 includes, at a receiving system in communication with a transmitting system via a communication link, accessing a response mapping for the receiving system defining: a set of real-time-response-critical functions of the receiving system associated with a real-time-response-critical latency threshold; and a set of safety-critical functions of the receiving system associated with a safety-critical latency threshold less than the real-time-response-critical latency threshold; and a set of safety responses, each safety response in the set of safety responses corresponding to a safety-critical function in the set of safety-critical functions in Block S110. The method S100 also includes: executing a time-synchronization protocol with the transmitting system to calculate a clock reference for the transmitting system in Block S120; and accessing a safety message schedule indicating an expected arrival time for each safety message in a series of safety messages based on the clock reference in Block S130. The method S100 additionally includes, for each safety message in the series of safety messages: calculating an arrival time of the safety message in Block S140; and calculating a latency of the safety message based on the arrival time of the safety message and the expected arrival time of the safety message in Block S150. The method S100 further includes, in response to a latency of a current safety message in the series of safety messages exceeding the safety-critical latency threshold and the real-time-response-critical latency threshold: initiating the safety response corresponding to the safety-critical function for each safety-critical function in the set of safety-critical functions in Block S160; halting the set of real-time-response-critical functions in Block S110; invalidating the clock reference for the transmitting system in Block S180; and reinitiating the time synchronization protocol in Block S190.

One variation of the method S100 includes, at a receiving system in communication with a transmitting system via a communication link, accessing a response mapping for the receiving system defining: a set of safety-critical functions of the receiving system associated with a safety-critical latency threshold; and a set of safety responses, each safety response in the set of safety responses corresponding to a safety-critical function in the set of safety-critical functions in Block S110. This variation of the method S100 also includes: executing a time-synchronization protocol with a transmitting system to calculate a clock reference for the transmitting system in Block S120; and accessing a safety message schedule indicating an expected arrival time for each safety message in a series of safety messages based on the clock reference in Block S130. This variation of the method S100 additionally includes, for each safety message in the series of safety messages: calculating an arrival time of the safety message in Block S140; and calculating a latency of the safety message based on the arrival time and the expected arrival time in Block S150. This variation of the method S100 further includes, in response to a latency of a current safety message in the series of safety messages exceeding the safety-critical latency threshold: initiating the safety response corresponding to the safety-critical function for each safety-critical function in the set of safety-critical functions in Block S170; invalidating the clock reference for the transmitting system in Block S180; and reinitiating the time synchronization protocol in Block S190.

Another variation of the method S100 includes, at a receiving system in communication with a transmitting system via a communication link, accessing a response mapping for the receiving system defining: a set of real-time-response-critical functions of the receiving system associated with a real-time-response latency threshold; and a set of restricted modes, each restricted mode in the set of restricted modes corresponding to a real-time-response-critical function in the set of real-time-response-critical functions in Block S110. This variation of the method S100 also includes: executing a time-synchronization protocol with a transmitting system to calculate a clock reference for the transmitting system in Block S120; and accessing a safety message schedule indicating an expected arrival time for each safety message in a series of safety messages based on the clock reference in Block S130. This variation of the method S100 additionally includes, for each safety message in the series of safety messages: calculating an arrival time of the safety message in Block S140; and calculating a latency of the safety message based on the arrival time and the expected arrival time in Block S150. This variation of the method S100 further includes, in response to a latency of a current safety message in the series of safety messages exceeding the real-time-response-critical latency threshold: initiating the restricted mode corresponding to the real-timeresponse-critical function for each real-time-response-critical function in the set of real-time-response-critical functions in Block S172; invalidating the clock reference for the transmitting system in Block S180; and reinitiating the time synchronization protocol in Block S190.

2. Applications

Generally, the method S100 is executed by a receiving system (e.g., a computational device) with safety-critical functions operating in communication with a transmitting system configured to transmit commands or operationally significant data to the receiving system for execution of the safety-critical functions. By executing Blocks of the method S100, the receiving system can: access a mapping of safety-critical functions of the receiving system to various levels of acceptable latency and corresponding safety responses; characterize current latency (i.e., latency of a current message relative to a most-recently-received message) and cumulative latency (i.e., latency accumulated over a buffer of messages or since a most-recent time reference) between the transmitting system and the receiving system; and, in response to either current or cumulative latency exceeding threshold latency, limiting, restricting, or modifying the safety-critical functions of the receiving system according to the mapping of safety-critical functions. Thus, by executing Blocks of the method S100, the receiving system remains safety compliant while agnostic to latency caused by complex networking environments. Additionally, by executing Blocks of the method S100, the receiving system can initiate safety responses corresponding to safety-critical functions in response to current latency or cumulative latency over a longer period of time, thereby enabling the receiving system to respond to clock drift between the receiving system and the transmitting system. Furthermore, the method S100 is executed by the receiving system as a push-based protocol, thereby enabling the receiving system to regulate safety-critical functions dependent on multiple transmitting systems.

In addition to enabling latency-based regulation of safety-critical functions, the receiving system, via execution of Blocks of the method S100, can also regulate response-critical and/or real-time-response-critical functions (i.e., functions of the receiving system requiring responses or real-time responses from the transmitting system respectively). Therefore, the receiving system can initiate latency-based responses for multiple functions affected by characteristics of the communication link between the receiving system and the transmitting device.

The receiving system, via execution of Blocks of the method S100, can initiate graded responses to various levels of latency, such that the latency-based response of the receiving system corresponds to the risk associated with increased latency in the communication link between the receiving system and the transmitting device. Thus, latency responses initiated by the receiving system can correspond to the level of latency observed over the communication link between the receiving system and the transmitting device.

Additionally, the receiving system can cooperate with a risk assessment interface at which a user can generate the mapping between response-critical (hereinafter, "RC"), real-time-response-critical (hereinafter, "RTRC"), and safety-critical (hereinafter, "SC") functions and latency-based responses for these functions. Thus, a user may customize the behavior of the system in response to various levels of latency characterized via execution of Blocks of the method S100 by the receiving system.

Furthermore, the system can cooperate with a reporting interface configured to generate prompts for a user of the receiving system directing the user to adjust latency thresholds for various functions of the receiving system and/or to adjust the configuration of the network in order to reduce interruptions in the functionality of the receiving system due to latency-based responses.

3. Network

Figure 1A:
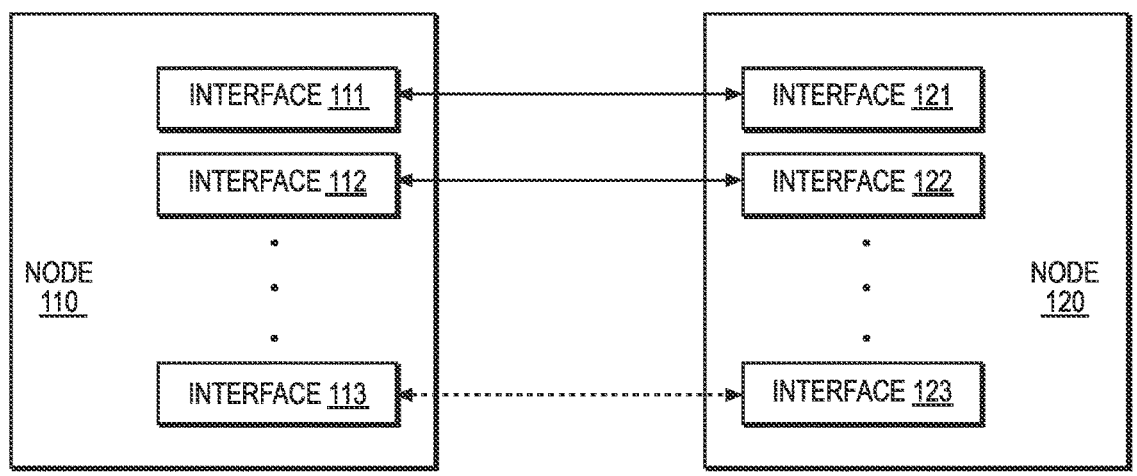
FIG. 1A is a schematic representation of the system.

Generally, as shown in FIG. 1A, the receiving system and the transmitting system operate within a network and communicate via a communication link between the receiving system and the transmitting system. Thus, the receiving system and the transmitting system can send and receive data over the communication link including time synchronization signals and safety messages transmitted and received according to Blocks of the method S100.

The network over which the receiving system and the transmitting system communicate can include any one or combination of wired or wireless local area networks, wide area networks, mesh networks, and/or direct communication channels (e.g., a direct RF or wired link). Additionally, the receiving system and/or the transmitting system can communicate via any protocol or combination of protocols corresponding to the network configuration.

In one example, the receiving system is a safety-critical remote-controlled vehicle and the transmitting system is a remote controller for the remote-controlled vehicle. In another example, the receiving system is an automated manufacturing robot and the transmitting system is an emergency shutoff switch. In yet another example, the receiving system is a controller configured to cause actuation of fuel rods within a nuclear reactor and the transmitting system is a control panel from which control signals are input to the nuclear reactor. Thus, via cooperation with the transmitting system, the receiving system executes RC, RTRC, and/or SC functions.

4. Risk Assessment

Generally, a user may perform a risk assessment identifying RC, RTRC, and SC functions of the receiving system that depend on communication with the transmitting device. Additionally, a user can identify latency thresholds associated with each of these functions and/or particular latency-based responses for each of these functions in the in response to the receiving system observing latency exceeding the latency thresholds associated with these functions. Thus, by generating the abovementioned response mapping via a risk assessment, a user may communicate, to the receiving system, information enabling the receiving system to regulate its own functionality in response to observed latency between the receiving system and the transmitting system.

4.1 Risk Assessment Interface

In one implementation, the user can generate the response mapping for functions of the receiving system via a risk assessment interface rendered via a risk assessment application. In this implementation, the risk assessment interface can render a graphical, textual, or other representation of the functions of the receiving system enabling the user to input specific latency thresholds and/or latency-based responses for each function specific to the risk level of each function. Thus, the receiving system can access a response mapping for functions of the receiving system based on inputs to a risk assessment interface.

4.2 Safety Function Identification

Generally, a user may categorize functions of the receiving system into RC functions, RTRC functions, and SC functions in order to communicate, to the receiving system, the level of latency that is acceptable for category of function. Additionally, the receiving system can access a response mapping including function-specific latency thresholds and responses independent of an assigned categorization of each function. However, by designating each function as one of an RC function, an RTRC function, or an SC function, a user may quickly communicate to the receiving system the risk associated with each function.

In one implementation, the receiving system can access a response mapping for RC functions of the receiving system. More specifically, the receiving system executes an RC function via a consistent and/or uninterrupted communication link between the transmitting system and the receiving system. However, the receiving system can execute an RC function, without an undue increase in risk, in view of significant latency in the communication link between the receiving system and the transmitting system. Thus, the receiving system can halt or adjust the functionality of an RC function in response to failing to receive a safety message within a threshold reception period, as is further described below.

In another implementation, the receiving system can access a response mapping for RTRC functions of the receiving system. More specifically, the receiving system executes an RTRC function via a low-latency communication link (e.g., characterized by less than a threshold latency) between the transmitting system and the receiving system. However, upon executing a RTRC function in view of latency greater than a threshold, the receiving system does not cause undue risk to humans associated with the receiving system. Thus, interruptions in the ability of the receiving system to execute RTRC functions does not meaningfully impact human safety but instead reduces functionality (e.g., output, accuracy, or any other metric) of the receiving system.

In yet another implementation, the receiving system can access a response mapping for SC functions of the receiving system. More specifically, the receiving system executes an SC function via a low-latency communication link (e.g., characterized by less than a threshold latency) between the transmitting system and the receiving system. Additionally, execution or lack thereof, of an SC function by the receiving system may cause an undue increase in risk to humans associated with the receiving system. Thus, the receiving system accesses a response mapping for SC functions that, in response to observing increased latency, cause the receiving system to enter a safety state or safety mode, thereby rendering the receiving system, fail-operational, fail-soft, fail-safe, or fail-secure, relative to elevated latency between the receiving system and the transmitting system.

4.3 Response Mapping

Generally, the receiving system can access a response mapping identifying RC, RTRC, and/or SC function of the receiving system, a latency threshold associated with each RTRC and/or SC function, and/or a latency-based response associated with each function in Block S110. More specifically, the receiving system can access a function mapping or response mapping for the receiving system defining: a set of response-critical functions of the receiving system; a set of real-time-response-critical functions of the receiving system associated with a real-time-response latency threshold; a set of restricted modes, each restricted mode in the set of restricted modes corresponding to a real-time-response-critical function in the set of real-time-response-critical functions; a set of safety-critical functions of the receiving system associated with a safety-critical latency threshold; and/or a set of safety responses, each safety response in the set of safety responses corresponding to a safety-critical function in the set of safety-critical functions. Thus, the receiving system can access a response mapping defining a set of latency thresholds specific to the level of risk associated with each function of the receiving system.

In one implementation, the receiving system can access a response mapping defining a set of SC functions, each corresponding to multiple latency thresholds, each latency threshold corresponding to a distinct latency-based response for the corresponding SC function. Thus, the receiving system can initiate a safety response for the SC function that is a discrete function of the latency observed by the receiving system. Similarly, the receiving system can access a response mapping defining a set of RTRC functions corresponding to multiple latency thresholds, each latency threshold corresponding to a distinct latency-based response for the corresponding RTRC function.

4.3.1 State-Based Response Mapping

In one implementation, the receiving system can access a response mapping that defines latency-based responses dependent upon both the observed latency of the communication link between the receiving system and the transmitting system and an operational state of the receiving system. More specifically, the receiving system can transition the safety-critical function into a safety mode by, for the safety-critical function in the set of safety-critical functions: identifying an operational state of the receiving system; selecting the safety mode from a set of safety modes based on the operational state of the receiving system; and transitioning the safety-critical function into the safety mode. Thus, the receiving system can automatically enter distinct safety modes in response to increased latency based on the current state of the receiving system.

In one example, the receiving system is a manufacturing robot configured to execute multiple types of assembly operations. In this example, the manufacturing robot can transition into a different safety mode in response to observed latency in excess of a latency threshold based on the current assembly operation being performed by the manufacturing robot.

4.4 Response Types

Generally, the receiving system can access a response mapping defining any kind of response corresponding to an RC, RTRC, or SC function and to a latency threshold. However, the receiving system can access a response mapping defining three types of responses including safety modes, restricted modes, and/or network reconfiguration responses. Thus, the receiving system can utilize these three categories of responses to mitigate risk and/or loss of functionality due to elevated latency between the transmitting system and the receiving system.

Additionally, the receiving system can access a response mapping defining latency-based responses based on two types of observed latency including current latency and cumulative (or windowed) latency.

4.4.1 Restricted Modes

In one implementation, the receiving system can access a response mapping defining a restricted mode corresponding to a RTRC function and to a latency threshold in order to improve performance of the receiving system during a period of increased latency. More specifically, the receiving system can access a response mapping defining a restricted mode of operation relative to the corresponding RTRC function, thereby limiting the effects of increased latency on the control of the receiving system.

In one example in which the receiving system is a remote-controlled vehicle, the receiving system can access a response mapping defining a restricted mode of operation for the steering function of the remote-controlled vehicle. In this example, the receiving system operating in the restricted mode can limit the maximum steering response of the vehicle, thereby preventing over-correction of steering inputs input by an operator at the transmitting system due to latency between the receiving system and the transmitting system.

4.4.2 Safety Modes

In another implementation, the receiving system can access a response mapping defining a safety mode corresponding to a SC function and to a latency threshold in order to guarantee safety of the receiving system during a period of increased latency. More specifically, the receiving system can access a response mapping defining a safety mode of operation relative to the corresponding SC function, thereby limiting the effects of increased latency on the safety of the receiving system.

In one example in which the receiving system is a manufacturing robot and the transmitting device is a remote emergency stop button, the receiving system can access a response mapping defining a safety mode of operation for the manufacturing robot. In this example, the safety mode can limit the maximum movement speed of the manufacturing robot, thereby preventing dangerous impact with humans upon accidental entry of a human within the range of movement of the manufacturing robot. Thus, the receiving system can reduce downtime and risk by operating in the safety mode during a period of increased latency between the receiving system and the transmitting system.

5. Latency Characterization Protocol

Generally, the receiving system and transmitting system cooperate to execute a latency characterization protocol capable of calculating "current latency," or the latency since a prior safety message in a series of safety messages and "cumulative latency," or the latency accrued over multiple safety message periods within a latency measurement window. More specifically, the receiving system and the transmitting system cooperate to execute the latency characterization protocol in two phases including a time synchronization phase in order to generate a clock reference for the clock of the transmitting system at the receiving system and a safety message phase, during which the transmitting system periodically transmits safety messages that are received by the receiving system and utilized for latency determination based on the clock reference calculated by the receiving system during the time synchronization phase. Each phase of the latency characterization protocol is described in further detail below.

5.1 Time Synchronization

Generally, during a time synchronization phase of the latency characterization protocol, the receiving system can execute a time-synchronization protocol with the transmitting system to calculate a clock reference for the transmitting system in Block S120. More specifically, the receiving system can: evaluate whether a valid clock reference exist for the transmitting system; in response to identifying that a valid clock reference does not exist, transmit a latency request to the transmitting device; and receive a latency response from the transmitting device restoring a clock reference for the transmitting device at the receiving system. Thus, upon invalidating the clock reference for the transmitting device at the receiving system, the receiving system can pull timing information from the transmitting device to update the clock reference from which the receiving system can later calculate latency between the transmitting device and the receiving system.

However, the receiving system and the transmitting system can calculate a clock reference for the transmitting system based on any round-trip time synchronization protocol (e.g., the network time protocol).

5.1.1 Clock Reference Validation

Generally, the receiving system can validate a clock reference for a transmitting system in communication with the receiving system. In one implementation, the receiving system can validate a clock reference for a transmitting system upon receiving greater than a threshold number of latency responses from the transmitting system. For example, the receiving system can validate a clock reference for a transmitting system in response to receiving greater than a minimum validation number of latency responses. Additionally, the receiving system can invalidate a clock reference in response to detecting greater than a threshold latency between the transmitting system and the receiving system.

5.1.2 Latency Request

Generally, in response to identifying that no valid clock reference exists for a transmitting system at the receiving system, the receiving system can transmit a latency request or latency measurement request message requesting timing information from the transmitting device. More specifically, the receiving system can transmit a latency measurement request message to the transmitting system, the latency measurement request message including a unique identifier for the transmitting system; and recording a departure time of the latency measurement request message. Thus, by timing the arrival of a latency response from the transmitting device relative to the departure time of the latency measurement request, the receiving system performs a two-way round-trip time synchronization protocol and obtains a clock reference for the transmitting device. Additionally, due to the inclusion of the unique identifier associated with the transmitting device, the receiving system can track clock references for multiple transmitting systems in communication with the receiving system by matching an identifier included in latency responses received by the receiving system to the unique identifier included in latency measurement request messages sent by the receiving system.

In one implementation, the receiving system includes a set of configuration parameters including a safety message period, a latency measurement window (for cumulative latency), resynchronization period (i.e., a time period after which a clock reference for the transmitter is considered invalid and the time synchronization phase of the latency characterization protocol is reinitiated by the receiving system), and a message period tolerance (i.e., a threshold latency for a single safety message after which the receiving system reinitiates the time synchronization phase of the latency characterization protocol). Therefore, in this implementation, the receiving system can dictate the frequency of safety messages (i.e., by defining the safety message period), as well as all periods governing initiation of time synchronization between the receiving system and the transmitting system. Thus, the receiving system can select configuration parameters that minimize latency-induced risks to humans as a result of SC functions of the receiving system.

5.1.3 Latency Response

Generally, upon receiving a latency measurement request message from the receiving system, the transmitting system can: generate a local (or internal) clock reference (e.g., a timestamp from the local clock of the transmitting device); and transmit a latency response message including the unique identifier from the latency measurement request message and the local clock reference for the transmitting device. The receiving system can then receive the latency measurement response message from the transmitting system including the unique identifier and a local clock reference of the transmitting system; match the unique identifier to the unique identifier included in the latency measurement request message to associate the latency measurement response message with the transmitting system; and calculate a clock reference for the transmitting system at the receiving system based on the local clock reference included in the latency measurement response message.

In one implementation, the transmitting system can include a set of safety message configuration parameters for safety messages transmitted during the safety message phase of the latency characterization protocol, such as the configuration parameters described above with respect to the latency measurement request message. Thus, in this implementation, the configure parameters for the safety message phase of the latency characterization protocol are dictated by the transmitting system and adopted by the receiving system.

5.2 Generate Clock Reference and Configuration Parameters

Generally, upon receiving the latency measurement response message, the receiving system can generate the clock reference for the transmitting time based on round trip time synchronization techniques. More specifically, the receiving system can generate the clock reference for the transmitting system based on the local clock reference of the transmitting system and the departure time of the latency measurement request message. Thus, upon initiation of the safety message phase of the latency characterization protocol, the receiving system can track latency relative to a known clock reference for the transmitting system.

In particular, the receiving system can access the departure time of the latency measurement request message, access the local clock reference or timestamp of the transmitting device included in the latency measurement response message, and record an arrival time of the latency measurement response message. The receiving system can then estimate a latency between the receiving system and the transmitting system and a clock bias of the transmitting system relative to the receiving system by assuming equal transmission time of the latency measurement request message and the latency measurement response message and equating the local clock reference of the transmitting system to a time at the receiving system halfway through the round-trip time (as measured by the period between the departure time of the latency measurement request message and the arrival time of the latency measurement response message).

5.3 Safety Message Phase

Generally, once the receiving system has identified a valid clock reference for the transmitting system, the receiving system can receive a series of scheduled or periodic safety messages from the transmitting system with which the receiving system can characterize current and cumulative latency between the transmitting system and the receiving system. Due to the predictable transmission of the series of safety messages, the receiving system can attribute variations between actual reception times of safety messages in the series of safety messages transmitted from the transmitting system and expected reception times indicated by the safety message schedule to latency in the communication link between the receiving system and the transmitting system.

5.3.1 Safety Message Schedule

Generally, upon generating a valid clock reference for the transmitting system via the time synchronization phase of the latency calibration protocol, the receiving system can access a safety message schedule indicating an expected arrival time for each safety message in a series of safety messages based on the clock reference in Block S130. Thus, the receiving system can measure the latency of each safety message transmitted as part of the safety message phase of the latency characterization protocol relative to the safety message scheduled.

In one implementation, the receiving system can generate the safety message schedule based on a safety message period and the clock reference for the transmitting system. More specifically, the receiving system can generate a safety message schedule indicating a series of expected arrival times of safety messages separated by the safety message period starting at a predetermined time based on the clock reference for the transmitting system (e.g., specified by configuration parameters exchanged between the transmitting system and the receiving system, or vice versa). In particular, the receiving system can generate the safety message schedule indicating an expected arrival time for each safety message in a series of safety messages based on: the clock reference; and a safety message period greater than a RTRC latency threshold and a SC latency threshold. In this implementation, the receiving system can define the safety message period greater than the RTRC latency threshold and the SC latency threshold such that these thresholds may be exceeded by latency in the communication link prior to triggering automatic resynchronization and regeneration of a clock reference for the transmitting system due to an increase in latency beyond the duration of the safety message period.

In another implementation, the receiving system or transmitting system can fully define a non-periodic safety message schedule (e.g., a safety message schedule in which safety messages are not transmitted at regular intervals but at a series of predetermined timings). In this implementation, the receiving system can receive a fully defined safety message schedule from the transmitting system or itself define the predetermined timings of each safety message in the series of safety messages. More specifically, the receiving system can receive configuration parameters transmitted by the transmitting system representing the safety message schedule. Thus, the receiving system can utilize variable rate safety messages to characterized latency between the transmitting system and the receiving system without interfering with other data transfer activities between the transmitting system and the receiving system.

6. Latency Calculation

Generally, upon establishing a safety message schedule for transmission of safety messages from the transmitting system to the receiving system, the receiving system can begin to receive this series of safety messages and characterize the latency of the communication link between the transmitting system and the receiving system based on differences between the arrival time of each safety message and the expected arrival time of the safety message as indicated by the safety message schedule or arrival time of a prior safety message and the safety message period. More specifically, the receiving system can, for each safety message in the series of safety messages: calculate an arrival time of the safety message in Block S140; and calculate a latency of the safety message based on the arrival time of the safety message and an expected arrival time of the safety message based on the safety message schedule in Block S150. Additionally, the receiving system can calculate two types of latency, including current latency and cumulative latency, in order to evaluate two types of latency thresholds corresponding to latency-based responses for functions of the receiving system. The calculation of each type of latency is further described below.

In one implementation, the receiving system can calculate both cumulative and current latency upon reception of each safety message in the series of safety messages. Thus, the receiving system can maintain an updated value for both cumulative and current latency, thereby enabling the receiving system to initiate corresponding latency-based responses accordingly.

6.1 Current Latency

In one implementation, the receiving system can calculate a current latency between the transmitting system and the receiving system. More specifically, the receiving system can, for each safety message in the series of safety messages: calculate the expected arrival time of the safety message in the series of safety messages by summing the safety message period and an arrival time of a prior safety message; and calculate a current latency of the safety message by calculating a difference of the expected arrival time of the safety message in the series of safety messages and the arrival time of the safety message. Thus, in this implementation, the receiving system calculates the current latency based on a reception time of the immediately prior safety message in the series of safety message and the safety message period. Thus, by calculating the current latency for each safety message in the series of safety messages, the receiving system can characterize the short-term or real-time variations in the latency of the communication link from one safety message to the next and react to these variations accordingly, as is further described below.

6.2 Cumulative Latency

In another implementation, the receiving system can calculate a cumulative latency between the transmitting system and the receiving system. More specifically, the receiving system can, for each safety message in the series of safety messages: access a window size for the series of safety messages; and calculate a cumulative latency over a set of prior safety messages equal to the window size. In particular, the receiving system can: calculate a current latency for each prior safety message in the number of prior safety messages based on a difference between the safety message period and a measured safety message period for the prior safety message; and summing the current latency for each prior safety message in the number of safety messages to generate the cumulative latency for the safety message. Thus, the receiving system can calculate the cumulative latency as an aggregate latency accrued over multiple safety messages within the window size for the cumulative latency. Therefore, the receiving system can better account for clock drift between the receiving system and the transmitting system and/or other long term network effects such as buffering that may affect the latency between the receiving system and the transmitting system.

7. Response Activation

Generally, upon calculating latency for a safety message in the series of safety messages received by the receiving system via the latency characterization protocol described above, the receiving system can compare the calculated latency relative to latency thresholds defined in the response mapping for the receiving system. More specifically, in response to various levels of latency calculated by the receiving system, the receiving system can initiate safety responses corresponding to functions of the receiving system, such as by initiating a safety mode for an SC function of the receiving system, by initiating a restricted mode for an RTRC function of the receiving system, by halting RC or RTRC functions of the receiving system, by reconfiguring the communication link between the receiving system and the transmitting system, and/or by initiating resynchronization of the receiving system and the transmitting system via the time synchronization protocol described above.

The receiving system can initiate a latency-based safety response (i.e., a safety response or latency-based response) in response to current latency calculated based on a most-recent safety message or based on the cumulative latency based on a most-recent set of safety message within the window size for the latency characterization protocol. More specifically, the receiving system can, in response to a latency of a current safety message in the series of safety messages exceeding the safety-critical latency threshold and the real-time-response-critical latency threshold, initiate the safety response corresponding to the safety-critical function for each safety-critical function in the set of safety-critical functions based on the response mapping in Block S160. Each type of safety response of the receiving system is described in further detail below.

7.1.1 Safety Modes

In one implementation, the receiving system can, for a SC function in the set of SC functions, transition the safety-critical function into a safety mode. More specifically, the receiving system can continue executing the SC function (in order to maintain the safe-functioning of the receiving system) in a safe state that is robust to any effects of latency between the transmitting system and the receiving system. Thus, by initiating a safety mode for an SC function of the receiving system, the receiving system reduces overall risk of the receiving system while maximizing up-time of the receiving system.

Additionally or alternatively, the receiving system can select a safety mode based for an SC function based on the operational state of the receiving system at the time the receiving system characterized the latency between the receiving system and the transmitting system as being greater than a SC latency threshold. More specifically, the receiving system can, for a safety-critical function in the set of safety-critical functions: identify an operational state of the receiving system; select the safety mode from a set of safety modes based on the operational state of the receiving system; and transition the safety-critical function into the safety mode. Thus, the receiving system can adjust the particular safety mode that it initiates for each SC function based on current conditions or metrics associated with the state of the receiving system.

7.1.2 Network Reconfiguration

In another implementation, the receiving system can initiate a safety response by adjusting the network configuration in an attempt to reduce latency between the transmitting system and the receiving system. More specifically, the receiving system can, for an SC function in the set of SC functions, transition to an alternative communication link between the receiving system and the transmitting system. Thus, the receiving system and the transmitting system can attempt to reduce risk caused by latency in association with the SC function by transitioning to a direct or otherwise more robust communication link between the receiving system and the transmitting system.

In one example, the receiving system can transition from a communication link leveraging a cellular network to a communication link over a local area wireless network. In another example, the receiving system can transition from a communication link leveraging a local area wireless network to a direct RF communication link over a low-traffic RF band. Thus, the receiving system can initiate an emergency alternative communication link that may be characterized by other disadvantages (e.g., data throughput) in order to minimize risk inducing latency between the transmitting system and the receiving system.

7.1.3 Restricted Modes

In yet another implementation, the receiving system can, for an RTRC function in a set of RTRC functions, transition the safety-critical function into a restricted mode based on a latency measurement exceeding an RTRC latency threshold. More specifically, the receiving system can: access the response mapping for the receiving system defining: a set of real-time-response-critical functions of the receiving system associated with a real-time-response latency threshold; and a set of restricted modes, each restricted mode in the set of restricted modes corresponding to the real-time-response-critical function in the set of real-time-response-critical functions and defining a series of restriction levels, each restriction level corresponding to a latency range. Subsequently, upon characterizing the latency between the receiving system and the transmitting system based on a safety message, the receiving system can: select a restriction level in the series of restriction levels for the restricted mode corresponding to the real-time-response-critical function based on the latency of the current safety message and the latency range corresponding to each restriction level in the series of restriction levels; and initiate the restricted mode characterized by the restriction level. Thus, the receiving system can initiate various levels of restriction commensurate to the amount of latency measured by the receiving system.

7.1.4 Function Halting

In yet another implementation, the receiving system can halt a set of RTRC and/or the set of RC functions of the receiving system in response to latency greater than a threshold latency in Block S170. More specifically, the receiving system can: halt the set of RTSC functions of the receiving system; and/or halt the set of RC functions of the receiving system. Thus, because these functions of the receiving system are not designated as safety-critical, the receiving system can cease executing these functions while results may be suboptimal due to latency greater than a latency threshold associated with these functions.

8. Resynchronization

In yet another implementation, the receiving system can trigger resynchronization between the receiving system and the transmitting system a according to the time synchronization phase of the latency characterization protocol described above based on a measured latency greater than a resynchronization threshold in Blocks S180 and S190. More specifically, the receiving system can: invalidate the clock reference for the transmitting system in Block S180; and reinitiate the time synchronization protocol in Block S190. Thus, in this implementation, the receiving system can initiate steps to resolve latency that may be a result of a loss of time synchronization or an inaccurate clock reference for the transmitting system at the receiving system.

In this implementation, the receiving system can initiate other safety responses while reinitiating the time synchronization phase of the latency characterization protocol in order to ensure safe operation of the receiving system while resynchronizing with the transmitting system.

9. Reporting and Response Adjustment Prompts

In one variation, the receiving system can generate reports, response adjustment prompts, and/or network adjustment prompts based on the frequency with which particular safety responses are triggered by the receiving system as a result of elevated latency between the receiving system and the transmitting system. In this implementation, the receiving system can generate reports or prompts via a reporting interface or via any other interface rendered based on data generated by the receiving system. Thus, the receiving system can inform users of potentially inappropriate latency thresholds corresponding to specific functions of the receiving system, thereby enabling more efficient operation of the receiving system without substantially modifying the level of latency-induced risk to humans of the receiving system.

In one example, the receiving system can: aggregate a number of safety response triggers over a reporting period based on the series of safety messages; and generate a prompt to adjust the SC latency threshold based on the number of safety response triggers. For example, if the receiving system detects that the number of safety response triggers exceeds a predetermined threshold number or of frequency of safety response triggers, then the receiving system can generate an adjustment prompt communicating the number of safety response triggers and any effects of these safety response triggers on the operation of the receiving system.

In another example, the receiving system can: aggregate latency data over a reporting period based on the series of safety messages; and generate a prompt for network reconfiguration based on the latency data. Thus, the receiving system can record latency data (e.g., the current latency for each safety message in the series of safety messages, the cumulative latency for each safety message in the series of safety messages) and compare these latency data with predetermined benchmarks of network performance for the communication link between the receiving system and the transmitting system. In response to identifying that the latency data is not consistent with (e.g., exceeds nominal levels of latency) the predetermined benchmarks of the network, the receiving system can therefore prompt a user to investigate the network configuration and/or alternative network configurations that may reduce the frequency of future latency-based safety responses initiated by the receiving system.

10. Additional Latency Characterization Protocol Description

The system can include at least one node (receiving system) (e.g., 120 shown in FIG. 1A) that functions to receive data by using at least one communication link, and optionally, at least one node (transmitting system) (e.g., 110 shown in FIG. 1A) that functions to transmit data by using at least one communication link.

The method can include one or more of: configuring a receiving system for message latency characterization S210; performing time synchronization S220; and processing at least one message received from a transmitting system S230.

Figure 3:
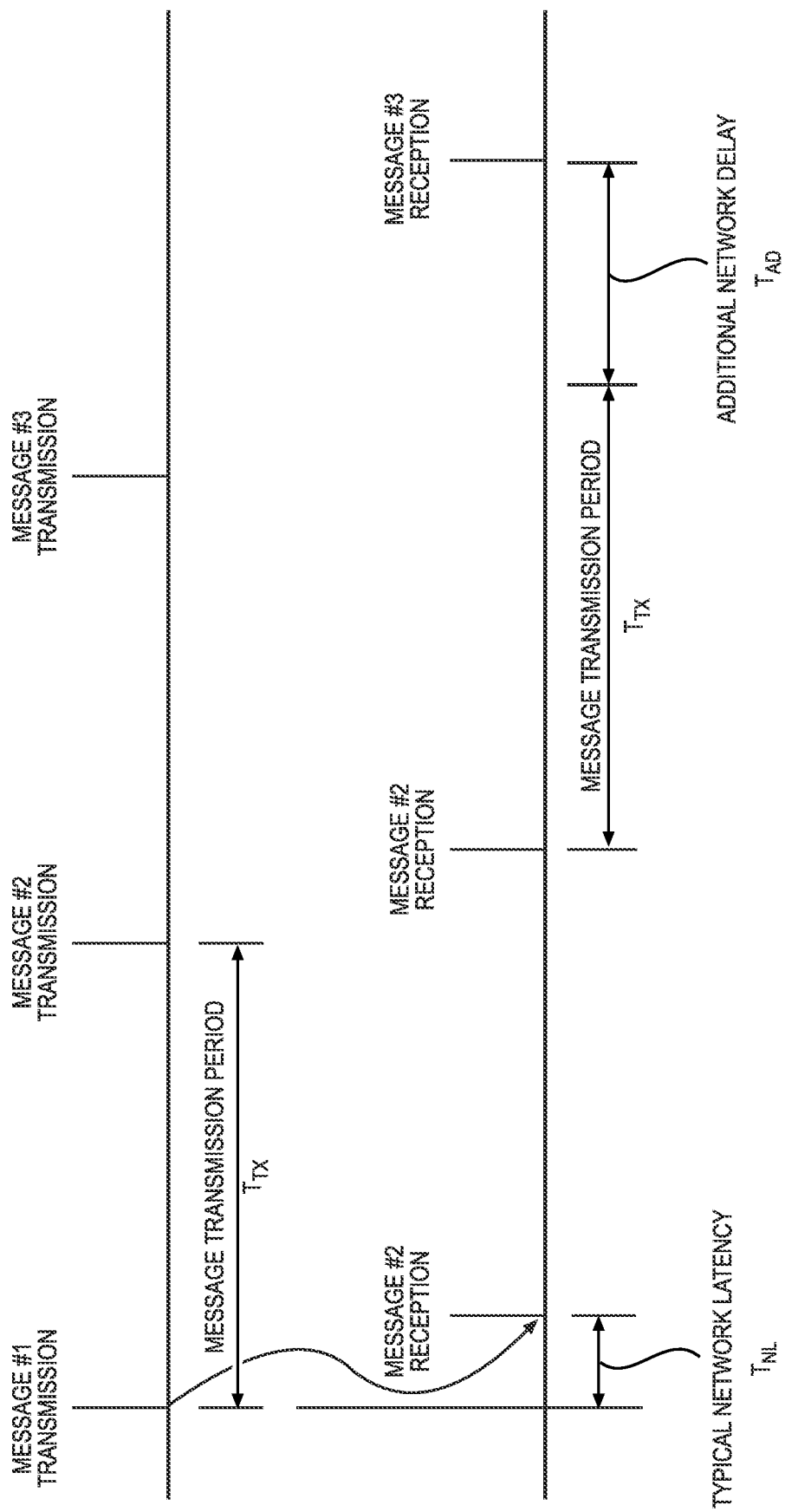
FIG. 3 is a schematic representation message transmission and reception.

In variants, the system and method measure one-way latency (e.g., a difference between a transmitting time when a message is transmitted by the transmitting system and a receiving time when the message is received by the receiving system). FIG. 3 shows timing of several message transmissions and message receptions. As shown in FIG. 3, the transmissions have a fixed period $T_{TX}$. By identifying this fixed period $T_{TX}$ the receiving system (e.g., 120 shown in FIG. 1A) can determine the expected reception times for any individual message. The actual time that the message is received may vary based on any one of the following factors: network delay; processing delay at the receiving system (e.g., 120); processing delay at the transmitting system (e.g., 110); clock drift between the transmitting system and the receiving system. However, any other suitable factors can effect actual time that the message is received.

Network delays in the network can be detected if they are larger than the required message period. In variants, since the message period is large compared to the typical time for a message to traverse the network, delays on the order of the message period can elicit an immediate fault response by the receiving system. Delays that are a fraction of the size of the message period can be harder to detect, since they will not cause a fault immediately, but could accumulate over time to represent a delay between the transmitting system and the receiving that is significant. It is useful to track this "accumulated latency", as network congestion and other factors can cause the latency to increase or decrease over time.

For example, if the message period is 100 ms, the receiving system would expect to receive the next message in sequence from a particular transmitting system 100 ms from when the previous message was received. If this next message is received after 110 ms, the 10 ms of latency will be added to the running total of accumulated latency.

In many cases, the additional latency is transient and will be resolved quickly. For example, the next message in the previous sequence would be expected to be received 200 ms from the first message (90 ms from the second). If this is the case, then the accumulated latency would then return to 0. If, instead, this message is received 210 ms from the original, the 10 ms of accumulated latency remains. It is also possible that the condition of the network worsens, such that this next message is delayed even further such that it is received 235 ms from the initial message. This would represent an accumulated latency of 35 ms.

Clock drift between the transmitting system and the receiving system will occur over time, but will accumulate very slowly (less than 200 us per message with a 20 Hz transmit rate and a 20 ppm clock reference). This can accumulate over time and result in a phase shift that can look like network latency to the receiving system. Clock drift can be mitigated by periodic synchronization (at S220 of the method 200 shown in FIG. 2A) of the internal clock and by using the latest message ID sent by the transmitting system. The receiving system can use the latest message ID sent to ensure that the accumulated latency it has accrued is due to clock drift and not network latency.

While message streams are typically sent from the transmitting system to the receiving system at fixed intervals, it is possible that some message streams may have a variable rate and therefore variable inter-message periods. Variable rate messages can complicate the calculation of latency, since the intended timing of each message may change over time.

Figure 4:
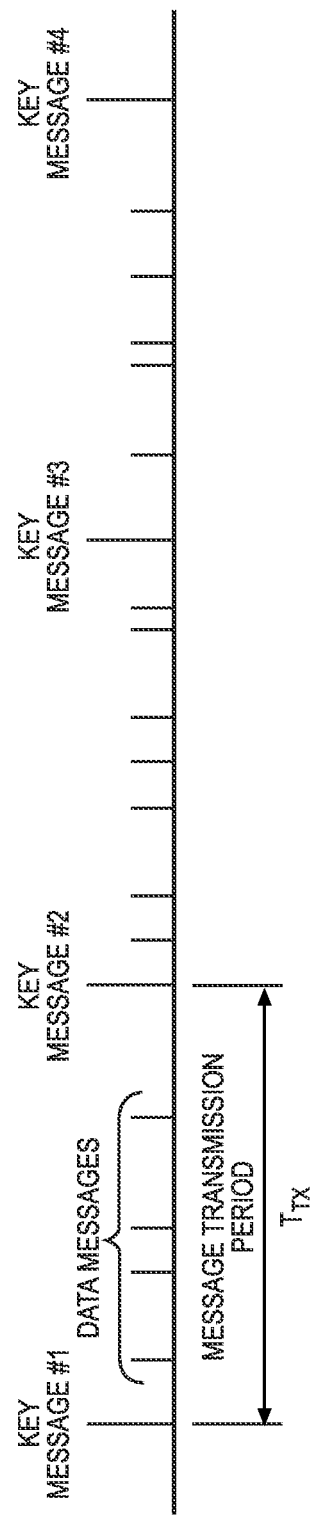
FIG. 4 is a schematic representation of periodic transmission of key messages for determining latency.

In variants, to avoid issues with the receiving system tracking this variable messaging rate, a predictable message rate (and thus period) can to be extracted from the overall message stream. This can be achieved by requiring the transmitting system to embed a regularly spaced message sub-stream (e.g., of key messages, as shown in FIG. 4) within the main message stream. This scheme (shown in FIG. 4), allows rate of data messages to vary with time, but maintains a consistent key message transmission period to ensure that the receiving system can maintain timing synchronization and latency characterization.

10.1 Benefits

The system and method can confer several benefits over conventional systems and methods.

First, by performing time synchronization as disclosed herein, more accurate latency information can be generated without use of an external time base such as a clock provided by a GPS receiver.

Second, by processing messages received from the transmitting system to determine latency information, latency issues in shared or wireless communication links can be identified and corrective action can be taken. Accordingly, safety enabled machine control can be performed using shared and/or wireless communication links.

Third, by characterizing transmission latency of the transmitting system at the receiving system, latency characterization can be performed at a single system that can be certified with a security rating.

However, further advantages can be provided by the system and method disclosed herein.

10.2 System

The system (e.g., 100 shown in FIG. 1A) functions to perform data communication between a transmitting system (e.g., 110) and a receiving system (e.g., 110). Communication can be performed by using or more interface devices. The system can include at least one node (e.g., 110, 120 shown in FIG. 1A, 130 shown in FIG. 1C) that functions to transmit data, and optionally, at least one node that functions to receive data.

Nodes can include one or more of an input safety controller (e.g., a remote emergency stop device), an output safety controller (e.g., an emergency stop base module), a system under control, a communication hub, a control system (e.g., for managing one or more systems under control), a computing device (e.g., wearable device, an embedded device, an implanted device, a medical computing device, a mobile device, a server, a laptop, a desktop, etc.), a network node (e.g., a router, network edge device, etc.), and the like.

In some variations, a system-under-control can be any suitable type of system to be controlled by another system (e.g., an output safety controller, a control system, etc.). Examples of systems-under-control include robots, vehicles (e.g., autonomous, semi-autonomous, etc.), industrial systems (e.g., manufacturing systems, farming systems, construction systems, waste processing systems, power systems, power generators, environmental control systems, military systems, transportation systems, etc.), home systems (e.g., HVAC, home automation, etc.). A system-under-control can be a terrestrial system, or a space system (e.g., satellite, spacecraft, missile, space probe, space station, etc.).

In some variations, at least one node includes at least one interface device (e.g., 111-113, 121-123 shown in FIG. 1A). In some variations, at least one interface device included in a node is a hardware device. Interface devices can include one or more of a wired interface device (for wired communication) and a wireless interface device (for wireless communication). Interface devices can support one or more protocols, such as, for example, universal serial bus (USB), Bluetooth, Wi-Fi, Ethernet, near field communication (NFC), LTE, ISM (Industrial, Scientific, Medical) and the like. In some implementations, at least one interface device is a radio (e.g., a receiver, transmitter, or transceiver). In some implementations, wireless communications interfaces include interfaces for one or more of long-range wireless communication, short-range wireless communication, wireless communication between terrestrial and spaceborne systems, etc.

Each interface device can have one or more of characteristics and configurable parameters. Characteristics and parameters can include one or more of latency, operating power, power consumption, bandwidth, operating frequency, wavelength, radio frequency modulation type, etc. However, interface devices can have any suitable characteristics and parameters.

Figure 1B:
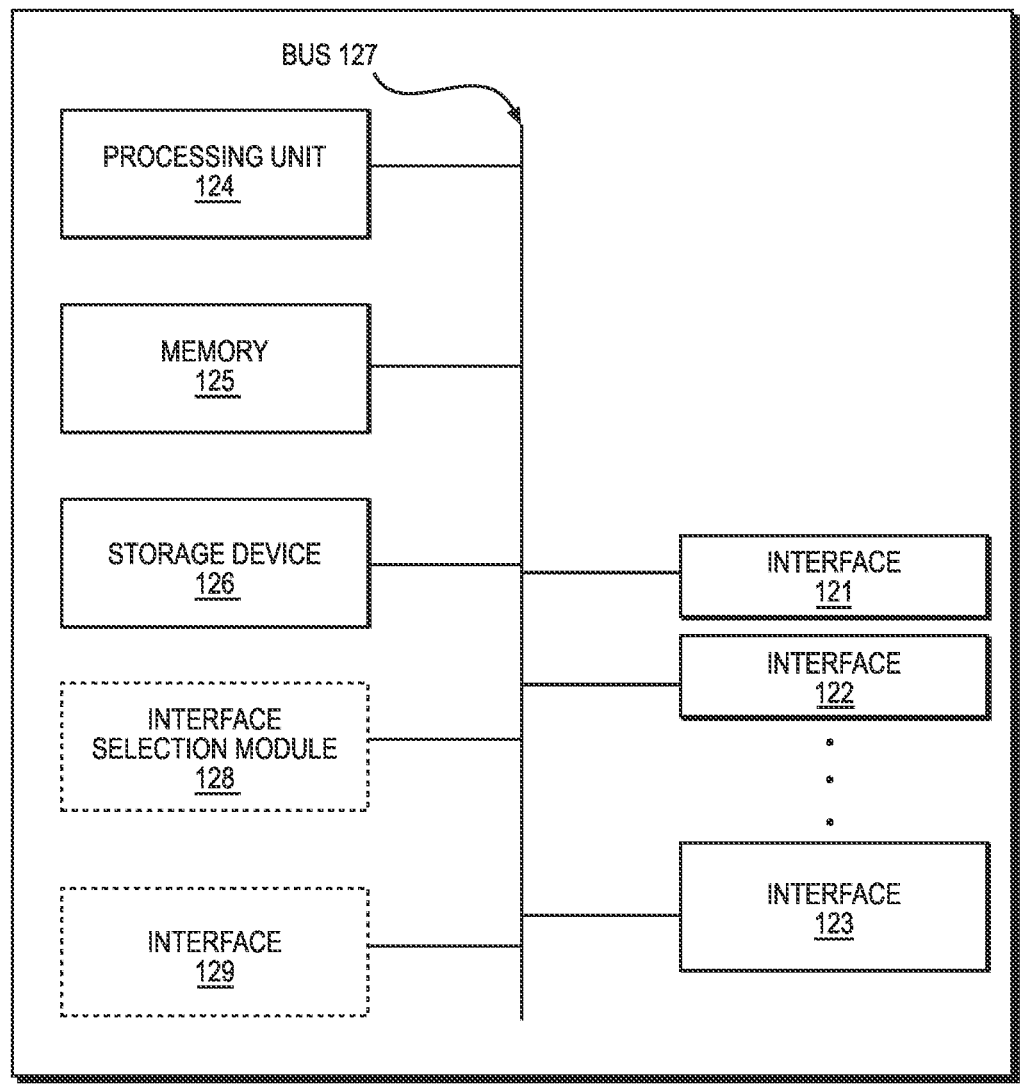
FIG. 1B is a schematic representation of a node of the system.
Figure 1C:
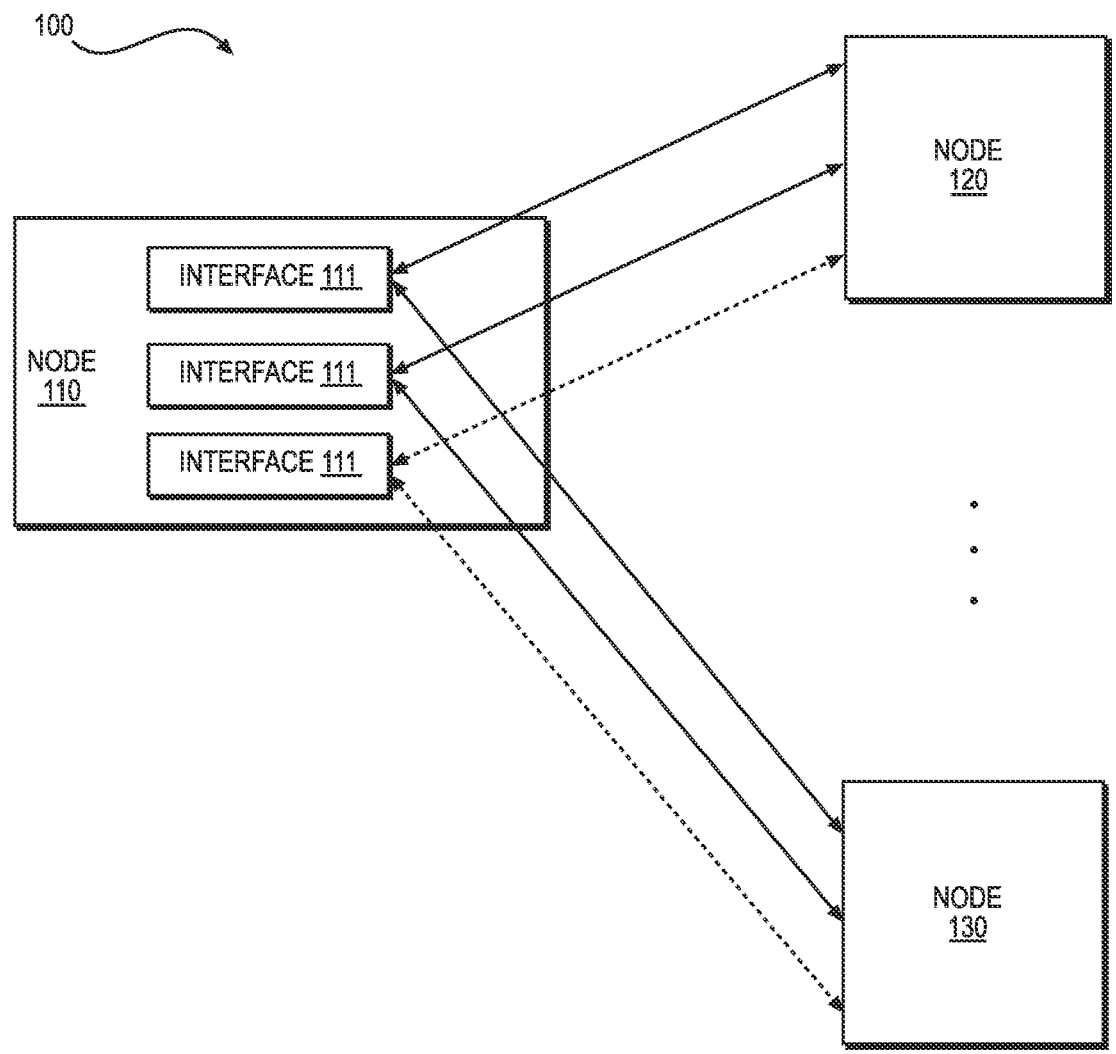
FIG. 1C is a schematic representation of a transmitting node transmitting to two receiving systems using a plurality of interfaces.

In some variations, a node can use a same interface to communicate with multiple other nodes (e.g., as shown in FIG. 1C). In some variations, a node uses a dedicated hardware interface to communicate with each other node, such that a single interface is not shared for communication with multiple other nodes.

Nodes can include interface devices having similar characteristics and interface devices having differing characteristics.

Nodes can include two or more interface devices having same or similar characteristics (e.g., a WiFi and an LTE interface, two LTE interfaces, two WiFi interfaces, etc.). In a first example, a node can include multiple copies of the same (or similar) interface device to provide redundancy (e.g., hardware redundancy). In a second example, a node can include multiple copies of the same (or similar) interface device to provide dedicated communication for a plurality of other nodes. In the second example, a node can include a separate WiFi hardware device for communication with each of a plurality of other nodes.

Interface devices can include interface devices (e.g., 111-113, 121-123) for multi-channel communication with other nodes, and optionally at least one network interface (e.g., 119) for communication via one or more networks (e.g., a public network, a private network, etc.). In an example, a first set of interface devices (e.g., 111-113, 121-123) can include wireless interfaces, whereas a second set of interface devices (e.g., 119) can include a wired interface. In some implementations, at least one interface device is used to receive configuration information for performing one or more of link monitoring, link selection, and link transition.

Nodes can include one or more of a processing unit (e.g., 124 shown in FIG. 1B), a memory (e.g., 125), a storage device (e.g., 126), an interface selection module (e.g., 128), an input device (e.g., a keypad, keyboard, mouse, wand, touch input device, microphone, camera, etc.), an output device (e.g., a display, a haptic device, speaker, a light, an emitter etc.). One or more components of a node can be coupled (e.g., communicatively, electrically, etc.) via a bus (e.g., 127).

The interface devices can function to transmit data (e.g., stored in the memory 125, the storage device 126, received from a network via interface device 129, accessed via the bus 127, etc.) wirelessly to other nodes.

Data can include one or more of data produced by a system-under-control and data consumed by a system-under control. However, any suitable type of data can be communicated by using the interface devices of a node.

Nodes can include several classes of data, and each class of data can be transmitted by using one or more of the interface devices.

In some variations, the interface selection module 118 functions to select one or more interface devices for transmitting each class of data.

In some variations, data classes include one or more of: safety critical data, real-time control critical data, control critical data, and informational data. Safety critical data can include data whose latency and integrity must be maintained at the highest level in order for the system-under control to operate safely. Real-time control critical data can include data containing command information for the system-under control resulting in direct, immediate action by the system-under control. Control critical data can include data containing command information for the system-under control which provides instructions for future action to be taken by the system-under control. Informational data can include data containing status and event information for or about the system-under control whose delivery latency does not cause any change in behavior of the system-under control. However, nodes can include any suitable classes of data.

In some variations, at least one component of the system performs at least a portion of the method.

10.3 Method

Figure 2A:
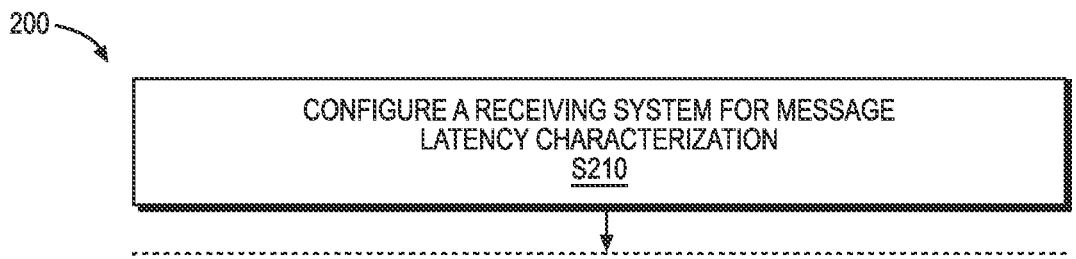
FIGS. 2A-C are representations of the method.
Figure 2B:
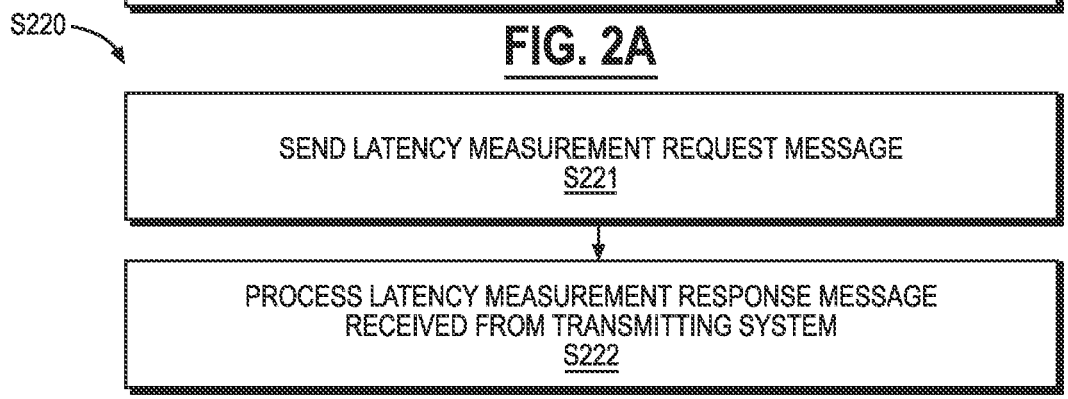
Figure 2C:
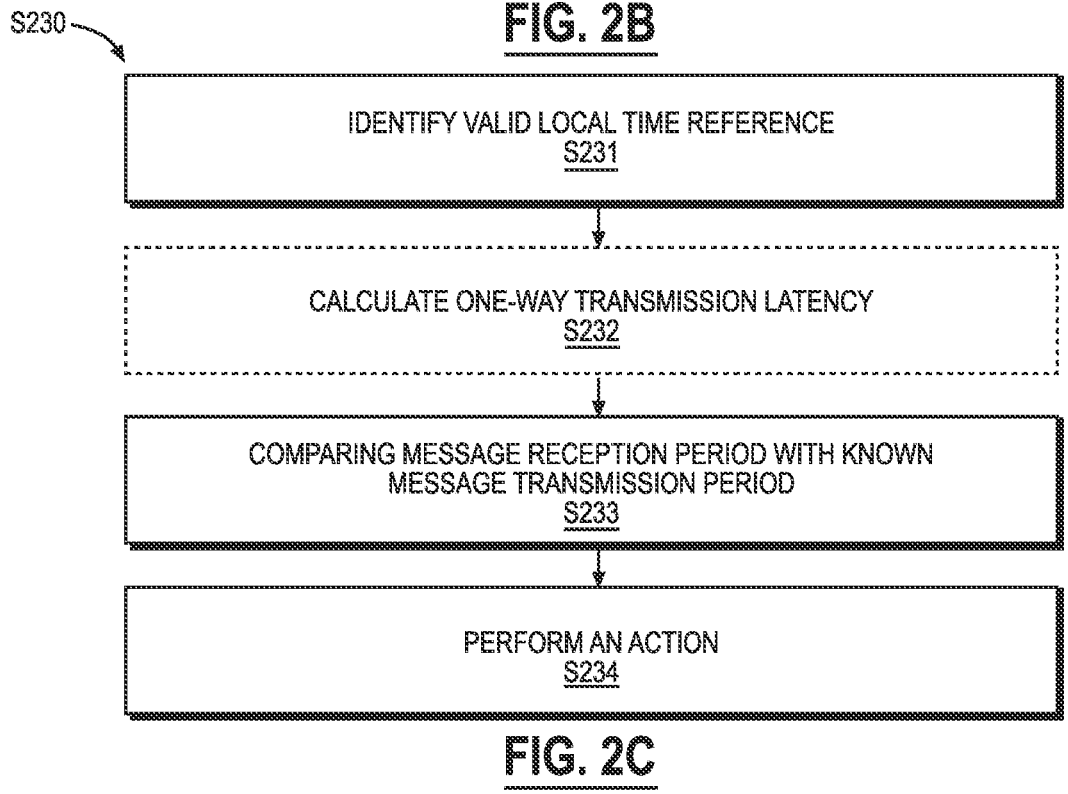

FIGS. 2A-C, are representations of variations of the method in accordance with embodiments.

In some variations, the method (e.g., 200) includes one or more of: configuring a receiving system for message latency characterization S210; performing time synchronization S220; and processing at least one message received from a transmitting system S230. In some variations, at least one component of the system performs at least a portion of the method. In some implementations, at least one receiving system (e.g., 120 shown in FIG. 1A) performs the method 200. In some implementations, a security certified secure processing element performs at least a portion of the method 200. However, any suitable system can perform at least a portion of the method 200.

Configuring a receiving system (e.g., 120) for message latency characterization S210 can include setting one or more configuration values at the receiving system (e.g., 120) for use by the receiving system during processing of a received message at S230. In some implementations, configuration values are received via one or more of a user interface, a network interface, an Application Programming Interface (API), a storage device, or any other suitable system. In some implementations, configuration values can be automatically generated (e.g., based on one or more rules, based on a configuration module, based on monitored data, etc.). In some implementations, configuration values are accessed from a set of default values. In some implementations, configuration values are set in accordance with a safety policy. In variants, configuration values can be updated. In variants, configuration values can be updated at any suitable time and in response to any suitable trigger (e.g., in response to user input, a detected event, a change in security policy, etc.).

In some implementations, the configuration values include one or more of: an expected message period; a message period tolerance; a minimum valid latency measurement window; a maximum latency measurement window; and an allowed out-of-required-latency time.

In variants, the expected message period ($T_{TX}$) is a length of time between messages sent by a particular transmitting system (e.g., 110).

In variants, the message period tolerance is an amount of time by which the period between messages received from a particular transmitting system can vary before a full re-characterization of message latency is necessary.

In variants, the minimum valid latency measurement window is a minimum number of latency measurement cycles that must be completed to consider the average latency measurement valid.

In variants, the maximum valid latency measurement window is a maximum number of latency measurement cycles that must be completed to be include in the average latency measurement for a measurement window.

In variants, the allowed out-of-required-latency time is a time for which the transmitting system is considered valid after it is declared out of sync. Once this time has expired the messages transmitted by the transmitting system may be considered invalid until the latency can be re-characterized to be within the allowed limits.

Performing time synchronization S220 functions to generate a valid local time reference for a transmitting system (e.g., 110 shown in FIG. 1A). In variants, the receiving system (e.g., 120) initiates time synchronization. Time synchronization can be performed at any suitable time, and in response to any suitable trigger. In a first example, time synchronization is performed in response to a determination that the receiving system does not have access to a valid local time reference for the transmitting system. In a second example, time synchronization is performed in response failure during message validation at S230. In a third example, time synchronization is performed in response to a user instruction (e.g., received via a user interface, API, network interface, etc.). In a fourth example, time synchronization is performed in response to detection of an event (e.g., a network event, a network failure, a processing delay at the receiving system, a processing failure at the receiving system, a fault, etc.). In a fifth example, time synchronization is performed in response to detection of clock drift between the transmitting system and the receiving system. However, the time synchronization process can be initiated by any suitable event trigger.

Performing time synchronization S220 can include: measuring a round trip time starting at a time at which a message is sent from the receiving system to the transmitting system, and ending at a time at which a message response is received by the receiving system from the transmitting system.

Figure 5:
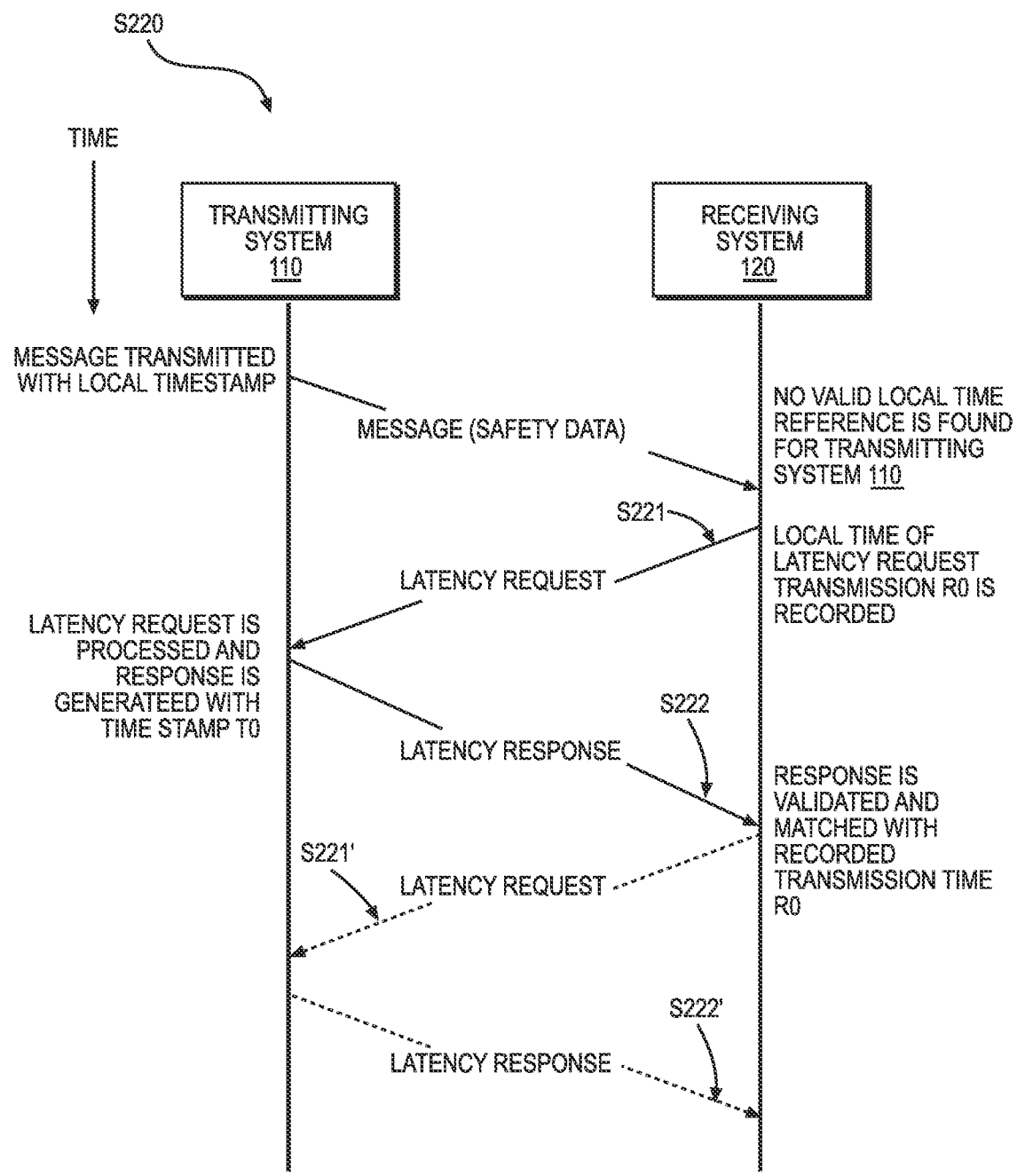
FIG. 5 is a schematic representation of performing time synchronization.

In some variations, performing time synchronization S220 includes: sending a latency measurement request message to the transmitting system S221; and processing a latency measurement response message received from the transmitting system S222 (as shown in FIGS. 2B and 5).

In variants, the latency measurement request message includes a unique identifier for the latency measurement request message. At S221, the receiving system records the unique identifier for the latency measurement request message as well as its local time ($R_o$) when the latency measurement request message is sent. However, the latency measurement request message can include any suitable information. In some implementations, in response to receiving the latency measurement request message, the transmitting system creates a latency measurement response message.

In some implementations, the latency measurement response message includes a local time stamp ($T_o$). In a first example, the local time stamp ($T_o$) identifies a current time according to a local clock of the transmitting system. In a second example, the local time stamp ($T_o$) identifies a current time according to an external clock (e.g., a clock of a GPS receiver, etc.).

In some implementations, the latency measurement response message includes a clock source identifier that identifies a source of the local clock used by the transmitting system to generate the local time stamp ($T_o$). In variants, the receiving system can use the clock source identifier to determine the frequency of synchronization required based on the drift rates of both its clock source and the clock source of the transmitting system.

In some implementations, the latency measurement response message includes the unique identifier included in the latency measurement request message received from the receiving system.

However, the latency measurement response message can include any suitable information.

Processing the latency measurement response message received from the transmitting system (S222) can include validating the latency measurement response message. In variants, validating the response message includes: identifying the unique identifier included in the latency measurement response message, and comparing the unique identifier included in the latency measurement response message with the unique identifier recorded for the latency measurement request message. In variants, if the unique identifiers do not match, then latency measurement response message is deemed invalid, and time synchronization is optionally restarted. If the unique identifiers match, then the response message is deemed to be valid, and the receiving system uses the unique identifier to access the recorded time ($R_o$) at which the latency measurement request message was sent.

In variants, at S222, the receiving system characterizes the typical one-way network latency ($T_{NL}$) that relates to a time between when a message is transmitted by the transmitting system and when the message is received at the receiving system.

In variants, at S222, the receiving system identifies a clock offset between a clock of the transmitting system (e.g., 110) and a clock of the receiving system (e.g., 120). The clock offset can be used to determine whether a difference between the local time stamp ($T_o$) and the current internal time ($R_C$) (of the receiving system when the response is received from the transmitting system) is related to transmission latency or clock drift.

In some implementations, the receiving system characterizes one or more of the one-way network latency ($T_{NL}$) and the clock offset by using one or more of: the recorded time ($R_o$) at which the latency measurement request message was sent, the time stamp ($T_o$) included in the latency measurement response message, and the current internal time ($R_C$) of the receiving system when the response is received from the transmitting system.

In an example, the receiving system can calculate the clock offset by determining a difference between the current internal time ($R_C$) of the receiving system when the response is received from the transmitting system and the time stamp ($T_o$) included in the latency measurement response message, and optionally adjusting this clock offset based on the recorded time ($R_o$) at which the latency measurement request message was sent. However, the clock offset can otherwise be determined.

In some examples, several latency requests can be received (e.g., at S221, S221' shown in FIG. 5), and several latency responses can be received (e.g., at S222, S222' shown in FIG. 5), and data recorded for each request and response can be used to characterize one or more of the one-way network latency ($T_{NL}$) and the clock offset.

In variants, the number of latency requests sent by the receiving system at S220 is determined by the minimum valid latency measurement window value set at S210. In variants in which several latency measurement request messages are sent by the receiving system at S220, a subsequent request message is sent (e.g., at S221' shown in FIG. 5) in response to receiving the response message for the preceding request message (e.g., at S222), so as to minimize the delay between receiving the response to the preceding request message and sending of the subsequent request message.

In some implementations, for each received response message (e.g., received at S222, S222', etc.), the receiving system compares the accessed time $R_o$ with the current internal time of the receiving system $R_C$ to identify the round trip time (starting at the time $R_o$ at which a message is sent from the receiving system to the transmitting system, and ending at a time $R_C$ at which a message response is received by the receiving system from the transmitting system). In variants, the round trip times for each latency measurement request message sent by the receiving system at S220 are averaged to provide an average round trip time.

In variants, the round trip time computed at S220 is used to characterize the typical one-way network latency ($T_{NL}$). In an example, at each iteration of S220, a difference between the local time stamp $T_o$ (included in the latency measurement response) and a receipt time $R_C$ at which the latency measurement response is received at the receiving system (as measured by a local clock of the receiving system) is computed, and this computed value represents the one-way network latency. This one-way network latency value can be validated by comparison with the round trip time (or current average round trip time) (calculated at S220) to verify that the one-way latency is less than the round trip time.

However, the one-way network latency ($T_{NL}$) can otherwise be characterized.

In variants, S220 includes recording a valid local time reference for the transmitting system. In some implementations, the valid local time reference identifies one or more of the one-way network latency ($T_{NL}$) and the clock offset characterized at S220.

In some implementations, the valid local time reference identifies an expected message transmission period for the transmitting system.

However, the valid local time reference can include any suitable timing information for the transmitting system that can be used by the receiving system to characterize latency of transmissions from the transmitting system to the receiving system at S230.

In variants, processing at least one message received from a transmitting system S230 includes: processing a plurality of messages received periodically from the transmitting system according to a known message transmission period ($T_{TX}$). The message transmission period can be configured at the receiving system (e.g., at S210).

In a first variant, the messages received at S230 are safety data messages (e.g., safety message sent by a safety transmitter to a safety controller) that are periodically sent by the transmitting system. In a second variant, the messages are key messages (e.g., sent from a safety controller to a safety transmitter) that are periodically sent by the transmitting system. The key messages can be sent along with other data sent at a variable rate (e.g., video data, etc.).

At S230, processing a message can include determining whether a valid local time reference is recorded for the transmitting system at the receiving system (S231 shown in FIG. 2C). In variants, the valid local time reference is a time reference recorded for the transmitting system at S220. In variants, the time reference identifies at least one of a one-way network latency ($T_{NL}$) and a clock offset for the transmitting system (e.g., 110).

In some implementations, even if a local time reference is recorded for the transmitting system at the receiving system, the local time reference can still be invalid if it has expired or fails to satisfy one or more criteria configured at S210 (e.g., valid time period, etc.)

If a valid local time reference is not recorded for the transmitting system at the receiving system, a new local time reference is generated for the transmitting system.

In variants, if a valid local time reference is recorded for the transmitting system at the receiving system, then the message is processed.

In variants, processing a message at S230 includes calculating a one-way transmission latency (S232 shown in FIG. 2C) for the message based on a time stamp T1 included in the message and the local time at which the message is received by the receiving system (according to a local clock of the receiving system). In some implementations, the one-way transmission latency is adjusted based on a clock offset identified in the local time reference for the transmitting system. In some implementations, the one-way transmission latency for the message is recorded at the receiving system, and used to track changes in the one-way transmission latency over a period of time.

In variants, processing a message at S230 includes comparing a computed message reception period with a known message transmission period to identify latency (S233 shown in FIG. 2C). In variants, S233 includes: determining an amount of time between reception of the message and reception of the previous message (using a clock of the receiving system), and comparing this time period with the known message transmission period $T_{TX}$ for the transmitting system to identify delays in message reception. If the time between received messages is greater than the known message transmission period, then transmission latency has increased. This transmission latency can be monitored over time and used to track accumulated latency. In some implementations, the known message transmission period $T_{TX}$ and the number of received messages can be recorded by the receiving system and used to record accumulated latency. For example, if the known transmission period is 100 ms and 5 messages have bene received, the fifth message would be expected to arrive 500 ms after receiving the first message at the receiving system; if the receiving system receives the fifth message 560 ms after receiving the first message, the difference between the expected and the actual reception time (560−500=60) represents accumulated latency.

Performing an action (S234 shown in FIG. 2C) can include performing at least one action (e.g., corrective action). S234 can include monitoring one or more of one-way transmission latency (identified at S232) and accumulated latency (identified at S233), and performing a corrective action in response to the monitoring.

Corrective actions can be triggered (e.g., at S234) if latency for a particular message, or accumulated latency, exceeds a tolerance value recorded for the transmitter.

Example corrective actions include one or more of: providing an alert, triggering a machine shutdown, selecting a new communication interface (e.g., 121, 122, 123 shown in FIG. 1A), triggering a fault response, modifying machine control values, modifying network control settings, etc. However, any suitable corrective action can be performed.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising, at a receiving system in communication with a transmitting system via a communication link:
    accessing a response mapping for the receiving system defining:
        a set of real-time-response-critical functions of the receiving system associated with a real-time-response-critical latency threshold;
        a set of safety-critical functions of the receiving system associated with a safety-critical latency threshold less than the real-time-response-critical latency threshold; and
        a set of safety responses, each safety response in the set of safety responses corresponding to a safety-critical function in the set of safety-critical functions;
    executing a time-synchronization protocol with the transmitting system to calculate a clock reference for the transmitting system;
    accessing a safety message schedule indicating an expected arrival time for each safety message in a series of safety messages based on the clock reference;
    for each safety message in the series of safety messages:
        calculating an arrival time of the safety message; and
        calculating a latency of the safety message based on the arrival time of the safety message and the expected arrival time of the safety message; and
    in response to a latency of a current safety message in the series of safety messages exceeding the safety-critical latency threshold and the real-time-response-critical latency threshold:
        initiating the safety response corresponding to the safety-critical function for each safety-critical function in the set of safety-critical functions;
        halting the set of real-time-response-critical functions;
        invalidating the clock reference for the transmitting system; and
        reinitiating the time synchronization protocol.

2. The method of claim 1, wherein accessing the safety message schedule comprises accessing the safety message schedule indicating an expected arrival time for each safety message in a series of safety messages based on:
    the clock reference; and
    a safety message period greater than the real-time-response-critical latency threshold and the safety-critical latency threshold.

3. The method of claim 2, wherein calculating the latency of the safety message comprises, for each safety message in the series of safety messages:
    calculating the expected arrival time of the safety message in the series of safety messages by summing the safety message period and an arrival time of a prior safety message; and
    calculating a current latency of the safety message by calculating a difference of the expected arrival time of the safety message in the series of safety messages and the arrival time of the safety message.

4. The method of claim 2, wherein calculating the latency of the safety message comprises, for each safety message in the series of safety messages:
    accessing a window size for the series of safety messages; and
    calculating a cumulative latency over a set of prior safety messages equal to the window size.

5. The method of claim 4, wherein calculating the cumulative latency over the set of prior safety messages equal to the window size comprises:
    calculating a current latency for each prior safety message in the number of safety messages prior safety message based on a difference between the safety message period and a measured safety message period for the prior safety message; and
    summing the current latency for each prior safety message in the number of safety messages.

6. The method of claim 1:
    wherein accessing the response mapping for the receiving system comprises accessing the response mapping for the receiving system defining:
        a set of response-critical functions of the receiving system;
        the set of real-time-response-critical functions of the receiving system associated with the real-time-response-critical latency threshold;
        the set of safety-critical functions of the receiving system associated with the safety-critical latency threshold less than the response critical latency threshold; and
        the set of safety responses, each safety response in the set of safety responses corresponding to the safety-critical function in the set of safety-critical functions; and
    further comprising, in response to the latency of the safety message exceeding the safety-critical latency threshold, the real-time-response-critical latency threshold, and the safety message period, halting the set of response-critical functions.

7. The method of claim 1, wherein executing the time-synchronization protocol with the transmitting system comprises:
    transmitting a latency measurement request message to the transmitting system, the latency measurement request message comprising a unique identifier for the transmitting system;
    recording a departure time of the latency measurement request message;
    receiving a latency measurement response message comprising the unique identifier and a local clock reference of the transmitting system; and
    generating the clock reference for the transmitting based on the local clock reference of the transmitting system and the departure time of the latency measurement request message.

8. The method of claim 1, wherein accessing the safety message schedule comprises generating the safety message schedule based on a safety message period and the clock reference for the transmitting system.

9. The method of claim 1, wherein accessing the safety message schedule comprises receiving configuration parameters transmitted by the transmitting system representing the safety message schedule.

10. The method of claim 1, wherein initiating the safety response corresponding to the safety-critical function for each safety-critical function in the set of safety-critical functions comprises, for a safety-critical function in the set of safety-critical functions, transitioning to an alternative communication link between the receiving system and the transmitting system.

11. The method of claim 1, wherein initiating the safety response corresponding to the safety-critical function for each safety-critical function in the set of safety-critical functions comprises, for a safety-critical function in the set of safety-critical functions, transitioning the safety-critical function into a safety mode.

12. The method of claim 11, wherein transitioning the safety-critical function into a safety mode comprises, for the safety-critical function in the set of safety-critical functions:
identifying an operational state of the receiving system;
selecting the safety mode from a set of safety modes based on the operational state of the receiving system; and
transitioning the safety-critical function into the safety mode.

13. The method of claim 1, further comprising:
aggregating a number of safety response triggers over a reporting period based on the series of safety messages; and
generating a prompt to adjust the safety-critical latency threshold based on the number of safety response triggers.

14. The method of claim 1, further comprising:
aggregating latency data over a reporting a period based on the series of safety messages; and
generating a prompt for network reconfiguration based on the latency data.

15. A method comprising, at a receiving system in communication with a transmitting system via a communication link:
accessing a response mapping for the receiving system defining:
a set of safety-critical functions of the receiving system associated with a safety-critical latency threshold; and
a set of safety responses, each safety response in the set of safety responses corresponding to a safety-critical function in the set of safety-critical functions;
executing a time-synchronization protocol with a transmitting system to calculate a clock reference for the transmitting system;
accessing a safety message schedule indicating an expected arrival time for each safety message in a series of safety messages based on the clock reference;
for each safety message in the series of safety messages:
calculating an arrival time of the safety message; and
calculating a latency of the safety message based on the arrival time and the expected arrival time; and
in response to a latency of a current safety message in the series of safety messages exceeding the safety-critical latency threshold:
initiating the safety response corresponding to the safety-critical function for each safety-critical function in the set of safety-critical functions;
invalidating the clock reference for the transmitting system; and
reinitiating the time synchronization protocol.

16. The method of claim 15:
wherein accessing the response mapping for the receiving system comprises accessing the response mapping for the receiving system defining:

a set of real-time-response-critical functions of the receiving system associated with a real-time-response-critical latency threshold;
the set of safety-critical functions of the receiving system associated with the safety-critical latency threshold less than the real-time-response-critical latency threshold; and
the set of safety responses, each safety response in the set of safety responses corresponding to the safety-critical function in the set of safety-critical functions; and
further comprising, in response to the latency of the current safety message in the series of safety messages exceeding the safety-critical latency threshold and the real-time-response-critical latency threshold, halting the set of real-time-response-critical functions.

17. The method of claim 15:
wherein accessing the response mapping for the receiving system comprises accessing the response mapping for the receiving system defining:
a set of real-time-response-critical functions of the receiving system associated with a real-time-response-critical latency threshold;
a set of restricted modes, each restricted mode in the set of restricted modes corresponding to a real-time-response-critical function in the set of real-time-response-critical functions;
the set of safety-critical functions of the receiving system associated with the safety-critical latency threshold less than the real-time-response-critical latency threshold; and
the set of safety responses, each safety response in the set of safety responses corresponding to the safety-critical function in the set of safety-critical functions; and
further comprising, in response to the latency of the current safety message in the series of safety messages exceeding the safety-critical latency threshold and the real-time-response-critical latency threshold, initiating the restricted mode corresponding to the real-time-response-critical function for each real-time-response-critical function in the set of real-time-response-critical functions.

18. The method of claim 15, wherein initiating the safety response corresponding to the safety-critical function for each safety-critical function in the set of safety-critical functions comprises, for a safety-critical function in the set of safety-critical functions, transitioning the safety-critical function into a safety mode corresponding to the safety-critical function.

19. A method comprising, at a receiving system:
accessing a response mapping for the receiving system defining:
a set of real-time-response-critical functions of the receiving system associated with a real-time-response latency threshold; and
a set of restricted modes, each restricted mode in the set of restricted modes corresponding to a real-time-response-critical function in the set of real-time-response-critical functions;
executing a time-synchronization protocol with a transmitting system to calculate a clock reference for the transmitting system;
accessing a safety message schedule indicating an expected arrival time for each safety message in a series of safety messages based on the clock reference;
for each safety message in the series of safety messages:

calculating an arrival time of the safety message; and
calculating a latency of the safety message based on the arrival time and the expected arrival time; and
in response to a latency of a current safety message in the series of safety messages exceeding the real-time-response-critical latency threshold:
initiating the restricted mode corresponding to the real-time-response-critical function for each real-time-response-critical function in the set of real-time-response-critical functions;
invalidating the clock reference for the transmitting system; and
reinitiating the time synchronization protocol.

20. The method of claim 19:
wherein accessing the response mapping for the receiving system comprises accessing the response mapping for the receiving system defining:
the set of real-time-response-critical functions of the receiving system associated with the real-time-response latency threshold; and
the set of restricted modes, each restricted mode in the set of restricted modes corresponding to the real-time-response-critical function in the set of real-time-response-critical functions and defining a series of restriction levels, each restriction level corresponding to a latency range; and
wherein initiating the restricted mode corresponding to the real-time-response-critical function for each real-time-response-critical function in the set of real-time-response-critical functions comprises:
selecting a restriction level in the series of restriction levels for the restricted mode corresponding to the real-time-response-critical function based on the latency of the current safety message and the latency range corresponding to each restriction level in the series of restriction level; and
initiating the restricted mode characterized by the restriction level.

\* \* \* \* \*